US007174180B2

(12) United States Patent
Andrews et al.

(10) Patent No.: US 7,174,180 B2
(45) Date of Patent: Feb. 6, 2007

(54) METHODS AND APPARATUS FOR TRANSMISSION SCHEDULING IN WIRELESS NETWORKS

(75) Inventors: Daniel Matthew Andrews, New Providence, NJ (US); Aleksandr Stolyar, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 192 days.

(21) Appl. No.: 10/895,743

(22) Filed: Jul. 21, 2004

(65) Prior Publication Data

US 2006/0019662 A1    Jan. 26, 2006

(51) Int. Cl.
*H04Q 7/20* (2006.01)
*H04L 12/28* (2006.01)
*H04L 12/56* (2006.01)

(52) U.S. Cl. ............... 455/512; 455/513; 455/435.3; 455/517; 455/518; 370/395.42; 370/395.41; 370/395.21; 370/395.4

(58) Field of Classification Search ........... 455/512, 455/435.3, 513, 517, 518; 709/207, 240; 370/395.42, 395.41, 395.21, 395.4
See application file for complete search history.

(56) References Cited

U.S. PATENT DOCUMENTS

| 5,541,919 A * | 7/1996 | Yong et al. ............... 370/416 |
| 2003/0135632 A1 * | 7/2003 | Vrzic et al. ............... 709/231 |
| 2004/0213259 A1 * | 10/2004 | Porter ..................... 370/395.2 |
| 2005/0059417 A1 * | 3/2005 | Zhang et al. .............. 455/515 |

* cited by examiner

*Primary Examiner*—George Eng
*Assistant Examiner*—Huy Phan (57) ABSTRACT

Systems and techniques for scheduling of data transmission to remote mobile units so as to provide at least an acceptably low level of delay. A scheduler computes an urgency value for each data stream serving a mobile unit and sets the urgency value equal to the highest urgency value of a data stream serving the mobile unit. The scheduler computes a scheduling priority for each mobile unit based on a computation that takes into account the urgency value of the mobile unit and schedules the highest priority mobile unit for service, selecting the highest priority data stream serving the mobile unit scheduled for transmission. The urgency value for a data stream depends on the sensitivity of the data stream to delay and the delay experienced by the data stream. Computation of the urgency value may take into account a delay limit associated with the data stream.

21 Claims, 3 Drawing Sheets

METHODS AND APPARATUS FOR TRANSMISSION SCHEDULING IN WIRELESS NETWORKS

FIELD OF THE INVENTION

The present invention relates generally to techniques for scheduling transmissions in wireless networks. More particularly, the invention relates to improved techniques for managing bandwidth resource allocation among a plurality of mobile units to be served by a wireless network base station.

BACKGROUND OF THE INVENTION

As wireless services continue to develop and are used in more and more applications, it becomes increasingly important to manage wireless transmissions so as to provide acceptable performance to each user for each of the user's applications. Maintaining a high level of overall throughput continues to be important in order to assure efficient use of network resources, but providing each user with an acceptable level of service is important for assuring customer satisfaction. Acceptable service is frequently thought of as comprising an acceptable service rate, that is, an acceptable average service rate for the user. Numerous techniques exist for managing transmissions so as to provide good overall service and fairness among users. One well known technique is the proportional fair scheduling technique. Various other prior art techniques deal with the service rates experienced by users. Such prior art techniques may be designed to maximize overall service or to provide some assurance that each user will be served. However, prior art techniques typically do not address all aspects of performance experienced by the various mobile units.

There exists, therefore, a need for improved systems and techniques for wireless service scheduling that assure acceptable performance for each mobile unit.

SUMMARY OF THE INVENTION

In one exemplary embodiment, an apparatus is provided for transmitting data to at least one of a plurality of remote mobile units, comprising a base station configured to serve the remote mobile units, the base station further comprising a communication interface for transmitting data to the remote mobile units and a processor for assigning scheduling priorities to each mobile unit, the scheduling priority assigned to a mobile unit determining a relative allocation of bandwidth resources to that mobile unit, the scheduling priority assigned to a mobile unit being based at least in part on the sensitivity to delay of one or more data streams serving the mobile unit and the delay currently experienced by the one or more data streams serving the mobile unit.

In another exemplary embodiment, an apparatus is provided for transmitting data to at least one of a plurality of remote mobile units, comprising a base station configured to serve the remote mobile units, the base station further comprising a communication interface for transmitting data to the remote mobile units and a processor for assigning scheduling priorities to each mobile unit, the scheduling priority assigned to a mobile unit determining a relative allocation of bandwidth resources to that mobile unit, the scheduling priority assigned to a mobile unit being based at least in part on a value computed based on the sensitivity to delay of one or more data streams serving the mobile unit and the delay currently experienced by the mobile unit, a value computed so as provide for an increased scheduling priority for a mobile unit as the mobile unit experiences an increased available transmission rate and by increasing the scheduling priority of a mobile unit as the average service rate experienced by the mobile unit decreases, and a value computed so as to provide for an increased scheduling priority of the mobile unit as the service rate experienced by the mobile unit decreases toward a minimum assured service rate for the mobile unit.

In another exemplary embodiment, a scheduler is provided for managing data transmission to at least one of a plurality of remote mobile units, comprising a unit status database for receiving and storing status information relating to data transmission to the mobile units, a unit parameter database for storing information relating to data transmission requirements for each mobile unit, and a priority computation module for examining the status information and the unit parameters for each mobile unit and to assign a scheduling priority to each mobile unit, the priority computation module assigning a priority to each mobile unit based at least in part on the delay sensitivity of one or more data streams serving the mobile unit and the delay experienced by the one or more data streams serving the mobile unit.

In a further exemplary embodiment, a method of data transmission to a selected at least one of a plurality of remote mobile units is provided, comprising the steps of computing a scheduling priority for each mobile unit, the computation of the scheduling priority being based at least in part on the delay sensitivity of one or more data streams serving the mobile unit and the delay experienced by the one or more data streams serving the mobile unit, and selecting for service from among the plurality of mobile units the mobile unit having the highest scheduling priority.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein.

The present invention addresses the need for management of delay experienced by mobile units and the data streams serving the mobile units. Managing scheduling so as to provide users with an acceptably low delay can be important for numerous applications, such as streaming audio and video, voice over Internet and the like. Many applications are sensitive to delay and will not provide acceptable performance if excessive delay is experienced, even if the service rate, that is, the amount of data received over time, is acceptable. Most prior art techniques that are directed toward providing acceptable service rates do not address the possibility of delays or latencies in the service. A guarantee or specification of a particular service rate generally relates to an average service rate, and an assurance that a user will receive a particular service rate does not mean that service will be provided at regular intervals, without any excessively long waits for service.

Most prior art scheduling techniques do not address the delay that a user may experience. However, as the capability of wireless systems increases and wireless systems are used in more applications, wireless mobile units are frequently used in applications where delay is an important consideration. Such applications include voice over internet, and streaming audio and video. Such applications rely on a relatively constant stream of data. A data stream that experiences excessive delays will not properly serve such applications, even if a delay is followed by a high data rate such that a relatively high average data rate prevails over the entire period under consideration. It typically does not matter to a user of a streaming video application that a delay is followed by a period of high data transfers. What matters to the user is that a delay occurs and the video stream stops during the delay.

In order to address these and other concerns, one aspect of the present invention includes a base station or base stations and a plurality of mobile units. Each base station transmits to at least one mobile unit at a time. Transmission occurs during one or more timeslots. A timeslot is a specified time period defined according to a protocol under which the network is operating. Transmission takes place over one or more timeslots, depending on the amount of data to be transmitted.

The base station chooses a mobile unit to be served by assigning priorities to mobile units depending on one or more factors, with at least one of the factors being the status of the mobile units with respect to their delay tolerances. Additional factors may include a desire to select mobile units that can achieve the best transfer rate and the desire to provide each mobile unit with a reasonable transfer rate, including achieving at least any minimum transfer rate guaranteed to a mobile unit.

The base station manages transmission scheduling so as to ensure that no mobile unit experiences more than an acceptable degree of delay. This assurance is achieved by computing an urgency value for each mobile unit, depending on the needs of the application in which the mobile unit is engaged and the delay that the mobile unit has experienced since the last transmission. A network may suitably be designed so that each mobile unit receives a number of separate data streams, one data stream for each application or category of applications for which the mobile unit is being used. For example, a mobile unit may be used for file transfer and streaming video at the same time. Different applications may have very different delay tolerances, so an urgency value may be computed for each data stream supplied to a mobile unit.

The base station may also use values and computations similar to those employed by proportional fair scheduling techniques. In such a case, a ratio is employed that balances the data rate that can be achieved by a mobile unit against the average service rate that has been experienced by the mobile unit. This ratio tends to increase the priority of a mobile unit having experienced an average rate that is low in comparison to the effective rate that it can achieve.

The assignment of priority to the various mobile units may also include taking steps to assure that no mobile unit receives less than a predetermined minimum level of service. It is also possible to assure that no mobile unit receives more than a predetermined maximum level of service.

Figure 1:
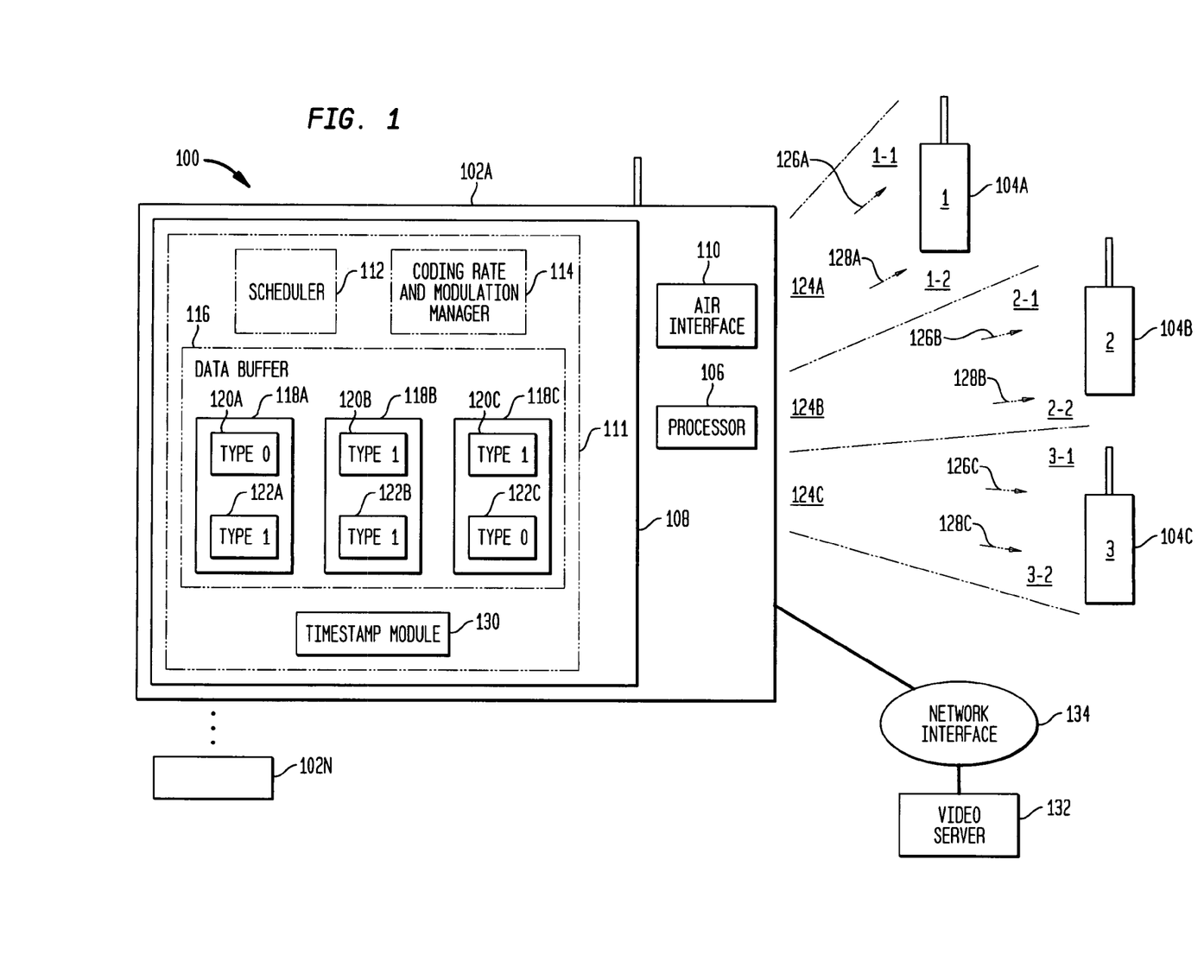
FIG. 1 illustrates a wireless network according to an aspect of the present invention.

FIG. 1 illustrates a wireless system 100, comprising a plurality of wireless network nodes, implemented here as base stations 102A . . . 102N. Only the base station 102A is illustrated in detail here, but it will be recognized that a wireless system 100 may, and typically will, employ large numbers of similar base stations, with each of the base stations serving a plurality of mobile units such as the mobile units 104A–104C. For simplicity of illustration, only a single base station 102A and three mobile units 104A–104C are illustrated here, but it will be recognized that many base stations and many mobile units may be supported.

The base station 102A may suitably include a processor 106 and memory 108, in order to store data and perform data processing required for the operation of the base station 102A. The base station 102A implements an air interface 110 for receiving transmissions directed to the base station 102A, for example by the mobile units 104A–104C, by other base stations or by other wireless control elements, and for transmitting signals to the mobile units 104A–104C, to other base stations and to other wireless network elements.

General principles of reception and transmission performed by the base station 102A are known in the art, and well known aspects of the operation of the air interface 110 are not described in detail here, except as required to provide context for the present invention.

In order to manage encoding and transmission of data, the base station 102A includes a transmission processing module 111. The transmission processing module 111 includes a scheduler 112 to manage transmissions to each of the mobile units 104A–104C. The scheduler 112 makes determinations as to which mobile unit or units are to be served next, based on the channel quality experienced by each mobile unit and other considerations such as available power and bandwidth and quality of service requirements.

The transmission processing module 111 also includes a coding rate and modulation manager 114. The coding rate and modulation manager 114 encodes data for transmission to the selected mobile unit. Depending on determinations made by the scheduler 112, the coding rate and modulation manager 114 either prepares a unit of data such as a codeword to be transmitted at once, during a single time interval, or in portions over a number of time intervals. The air interface 110 encodes data and transmits a radio frequency (RF) signal representing the data. The data may be held for transmission in a data buffer 116, comprising a plurality of hosting unit buffers 118A–118C. In the embodiment shown, each of the unit buffers 118A–118C hosts data to be transmitted to a corresponding one of the mobile units 104A–104C. Each of the unit buffers 118A–118C hosts one or more data queues to be transmitted as data streams. For example, the buffer 118A hosts the data queues 120A and 122A, the buffer 118B hosts the data queues 120B and 122B and the buffer 118C hosts the data queues 120C and 122C. Data is transmitted to each of the mobile units 104A–104C in the form of data streams, transmitted across the channels 124A–124C, respectively. Illustrated here are the data streams 126A and 128A, representing data transmitted from the queues 120A and 122A, respectively, the data streams 126B and 128B, representing data transmitted from the queues 120B and 122B, respectively, and the data streams 126C and 128C, representing data transmitted from the queues 120C and 122C, respectively. Each of the data streams comprises data selected for transmission and transmitted across the appropriate channel according to priorities determined by the scheduler 112. The data streams are categorized as belonging to various types, including type 0 data streams, type 1 data streams and type 2 data streams. A data stream's type depends on its delay requirements, with a type 0 data stream being relatively insensitive to delay, a type 1 data stream being more sensitive to delay and tending to receive a higher priority as its delay increases, and a type 2 data stream receiving an absolute maximum delay guarantee. Considerations used in managing the various types of data streams are described below in greater detail. In the example illustrated in FIG. 1, the data streams 126A and 128C for which data is stored in data queues 120A and 122C respectively are type 0 data streams and the data streams 128A, 126B, 128B and 128A for which data is stored in data queues 122A, 120B, 122B AND 120C are type 1 data streams.

In one embodiment, the base station 102A performs one transmission at a time, so that at any time, only one transmission of data in one of the data streams is occurring. The transmission is directed to only one of the mobile units 104A–104C.

For each timeslot, the scheduler 112 selects one of the mobile units 104A–104C to be served during that timeslot, and the appropriate one of the data streams 126A, 128A, 126B, 128B, 126C and 128C to be served. The mobile unit 104A is designated as mobile unit 1, the mobile unit 104B is designated as mobile unit 2 and the mobile unit 104C is designated as mobile unit 3. The data stream 126A is designated as data stream 1 of mobile unit 1, or data stream 1-1, and the data stream 128A is designated as data stream 2 of mobile unit 1, or data stream 1-2. Similarly, the data stream 126B is designated as data stream 2-1, stream 128B is designated as data stream 2-2, stream 126C is designated as data stream 3-1 and stream 128C is designated as data stream 3-2.

The scheduler 112 computes a priority for each mobile unit and selects the mobile unit having the highest priority. Computation of priorities is performed so as to achieve an acceptably low delay for each mobile unit. The computation of priorities may also take into account other considerations, such as a desire to maximize overall throughput for the system 100. The scheduler 112 therefore takes into account the available transfer rate achievable for transmission to each mobile unit during the timeslot under consideration. The available transfer rate depends on the quality experienced by each mobile unit. Channel quality information is provided to the scheduler 112 through the use of a feedback signal transmitted from each of the mobile units 104A–104C to the base station 102A.

In the present exemplary embodiment, the scheduler 112 computes a scheduling priority value that is directed toward achieving a high level of overall throughput while assuring acceptable service for each mobile unit and each data stream. Acceptable service includes acceptably low delay for each mobile unit and may also include an acceptable data rate for each mobile unit, with the rate achieving at least a specified minimum. Suitably, for each timeslot t, the scheduler 112 designates the mobile unit i to be served as the mobile unit for which the value $$SP_i = \frac{r_i(t)}{R_i} e^{a_i T_i + w_i} \quad (1)$$

is greatest, where $SP_i$ is the scheduling priority value for the mobile unit i, $r_i(t)$ is the effective transfer rate to mobile unit i at time t, $R_i$ is the average service rate that mobile unit i has received, $T_i$ is the value for mobile unit i of a token count designed to ensure a minimum and, if desired, maximum, service rate for each mobile unit and $w_i$ is a unit urgency value for mobile unit i, designed to ensure that the mobile unit i does not experience more than an acceptable delay. The unit urgency value $w_i$ may suitably be the highest value of $w_{ij}$, where $w_{ij}$ is a data stream urgency value for a data stream ij serving the unit i.

The urgency value for a mobile unit i or a data stream ij is a value indicating the urgency with which an entity, such as a mobile unit or data stream, needs to be served in order to deliver acceptable performance. The urgency value is computed based on delay considerations related to the entity and takes into account the delay sensitivity of the entity and the delay currently experienced by the entity. For an entity that is sensitive to delay, the urgency value for the entity will increase with increasing delay, thereby tending to increase the scheduling priority for the entity and thus insuring that the entity will receive service without inordinate delay. As will be discussed in further detail below, the computation of the urgency value for an entity may be influenced by a number of considerations, for example whether the entity is sensitive to delay, whether the entity has a relatively high sensitivity to delay or whether the entity has a relatively high sensitivity to violation of a delay limit.

Each mobile unit i is typically served by a number of data streams ij, with an urgency value $w_{ij}$ characterizing each data stream. Each data stream ij has an associated urgency value $w_{ij}$ whose response to delay depends on the delay sensitivity of the data stream ij. A data stream ij that is insensitive to delay, for example a file transfer, will typically be characterized by an urgency value $w_{ij}$ that is set at 0. A data stream ij that is sensitive to delay will typically be characterized by an urgency value $w_{ij}$ that increases with increasing delay. Depending on the nature of the data stream ij, the urgency value $w_{ij}$ may be more or less sensitive to a delay limit. If sensitivity is high, the urgency value $w_{ij}$ increases rapidly as the delay limit is approached. If sensitivity is low, the rate of increase of the urgency value $w_{ij}$ may be slightly affected, or unaffected, by the approach to or violation of the limit.

As noted above, the greatest data stream urgency value $w_{ij}$ for a mobile unit i is chosen for the unit urgency value $w_i$. It can be seen from an examination of equation (1) that the value of $SP_i$ is influenced by the value of $w_i$, so that a larger value of $w_i$ tends to increase the value of $SP_i$ for a mobile unit and thus to increase the mobile unit's scheduling priority.

The value $a_i$ is an adjustable parameter, expressed in units of bits per timeslot, which may be set differently for each remote mobile unit. The parameter $a_i$ affects the timescale over which the actual rate of service will tend to track the target rate or rates. A typical value for $$\frac{1}{a_i}$$

is given by the product of the target minimum average transmission rate, multiplied by the time constant $\tau$. The time constant $\tau$ is used to compute updated values for the average service rate $R_i$, which is suitably updated by exponentially weighted averaging.

Exponentially weighted averaging is described in our related application by Andrews et al., entitled "Method for Scheduling Wireless Downlink Transmissions Subject to Rate Constraints," U.S. patent application Ser. No. 10/122,660, filed on Apr. 15, 2002, which is assigned to a common assignee with the present invention and is incorporated herein by reference in its entirety. This Andrews patent application also teaches systems and techniques for assuring each user a minimum level of service, and for restricting each user to a specified maximum level of service. A frequently used value for the target minimum rate in CDMA systems is 9.6 kilobits per second, or 16 bits per timeslot, with the CDMA protocol calling for 600 timeslots per second, for a timeslot duration of approximately 1.65 milliseconds. Another frequently used value is 28.8 kilobits per second, or 48 bits per timeslot.

The expression $$\frac{r_i(t)}{R_i}$$

is known from proportional fair scheduling techniques. The use of the value $R_i$ as the denominator of the fraction tends to increase the priority of lesser served mobile units, because the value of the fraction tends to increase as the value of $R_i$ decreases. Therefore, the priority of an underserved mobile unit will tend to eventually rise to the level calling for the mobile unit to be served, even if the mobile unit is experiencing an unfavorable channel condition leading to a lower value of $r_i$. The average service rate $R_i(n)$ may be updated according to the following formula:

$$R_i(n+1) = \left(1 - \frac{1}{\tau}\right)R_i(n) + \frac{1}{\tau}r_i(n).$$

The selection of a value for the time constant T depends on the maximum length of time during which an individual mobile unit can tolerably be denied service. A decrease in the value of $R_i(n)$ tends to increase the scheduling priority of the mobile unit, and the value of the time constant $\tau$ affects the rate at which the value of $R_i(n)$ decays. A higher value for $\tau$ causes the value of $R_i(n)$ to decay at a lower rate and a lower value for $\tau$ causes the value of $R_i(n)$ to decay at a higher rate. A high rate of decay for $R_i(n)$ tends to emphasize an individual's need for service, while a lower rate of decay for $R_i(n)$ tends to emphasize a high rate of overall throughput. One suitable value for the time constant $\tau$ is 1024 timeslots, which in typical CDMA networks is equivalent to 1.71 seconds, but it will be recognized that a wide range of values for the time constant $\tau$ is possible, based on the considerations above.

The use of the value $T_i$ in equation (1) helps to ensure that each mobile unit receives at least a minimum data transfer rate. The value $T_i$ is a rate token counter value that is incremented at every timeslot and decremented whenever the mobile unit i is served. The value of $T_i$ is given in bits, and the amount by which the value $T_i$ is decremented is the encoder packet size of the transmission to mobile unit i. The amount by which the value $T_i$ is incremented depends on the value of $T_i$, with the increment being greater if $T_i$ is above a specified value and smaller if $T_i$ is below the specified value.

The scheduler 112 computes the value of $w_i$ for each of the mobile units 104A–104C in order to give the scheduling priority value $SP_i$ a component based on the delay tolerance of the mobile unit and the delay which the mobile unit has already experienced. Typically, each mobile unit may be used in several simultaneous applications with each application having a different delay tolerance. Therefore, it is useful to consider all data streams ij serving each mobile unit, with the value $w_{ij}$ being the urgency value of the stream ij serving the mobile unit i. The scheduler 112 evaluates the urgency value of all streams ij serving a mobile unit i, and the maximum value of $w_{ij}$ for a mobile unit is chosen as the value of $w_i$ for that mobile unit. The value of $w_i$ is used in equation (1) to compute the value of $SP_i$ for each mobile unit, and the mobile unit i for which the value of $SP_i$ is greatest is chosen for service. Once the mobile unit has been selected for service, the stream ij for which the value of $w_{ij}$ is greatest is chosen for service.

Suitably, the computation of the value of $w_{ij}$ for a stream depends on various characteristics of the stream, such as delay tolerance. Data streams may be characterized in many different ways. For example, a data stream may be characterized as relatively sensitive or insensitive to delay. If a data stream is characterized as insensitive to delay, the value of $w_{ij}$ may be fixed, so that the urgency value $w_{ij}$ for the data stream does not increase with increasing delay. If a data stream is characterized as relatively sensitive to delay, the urgency value $w_{ij}$ may increase with increasing delay. In addition, the data stream may be more or less sensitive to the prospect of violation of a delay limit. If a data stream is sensitive to delay but not particularly sensitive to violation of the delay limit, the urgency value $w_{ij}$ for the data stream may simply continue to increase at rate prevailing before an approach to the limit, without being affected by the approach to or a violation of the limit. The increase in urgency value will tend to increase the scheduling priority for the mobile unit being served by the data stream, but the increase in urgency value will be such as to prevent an inordinate delay of service, rather than to sharply increase the scheduling priority for the mobile unit in order to prevent violation of a limit.

On the other hand, if a data stream has a relatively high sensitivity to delay and to violation of a delay limit, the urgency value $w_{ij}$ may be computed so that the urgency value $w_{ij}$ increases rapidly as a delay limit is approached. Such a rapid increase in the urgency value will tend to result in a very high scheduling priority for the mobile unit being served by the data stream, and will tend to cause the mobile unit to be served before the delay limit is violated.

Other data streams may be extremely sensitive to delay and to violation of a delay limit. For such data streams, the delay experienced by the data stream may be monitored and the urgency value $w_{ij}$ may be computed so as to guarantee, as nearly as possible, that no violation of any delay limit will occur. It will be recognized that numerous ways of characterizing and addressing the sensitivity of a data stream to delay exist, and that the urgency value $w_{ij}$ may be computed in numerous ways so as to manage delay appropriately for the needs of each data stream.

One convenient way to characterize data streams as to characterize a data stream as belonging to one of three types, depending on the delay tolerance of the streams, the maximum delay limits required by the streams and the sensitivity of the data streams to any delay limits.

A type 0 stream is a stream with high delay tolerance, such as an http or ftp data stream. For such streams, the value of $w_{ij}$ is simply the following:

$$w_{ij}=0 \quad\quad\quad (2)$$

because rate considerations may be important in evaluating the priority of such a stream, but delay considerations are not.

A type 1 stream is a stream that is scheduled so as to have a transmission rate $R_{ij}^{delay}$ and a delay limit $D_{ij}$. The transmission rate $R_{ij}^{delay}$ is expressed in terms of bits per timeslot, and the delay limit $D_{ij}$ is expressed in terms of timeslots. The delay limit $D_{ij}$ indicates the maximum number of timeslots before the data stream ij is served.

The urgency value for the stream may be expressed as a function of a current delay parameter $d_{ij}$ and the delay limit $D_{ij}$. The current delay parameter $d_{ij}$ is expressed in terms of timeslots, and indicates the number of timeslots that have passed without the stream ij having been served.

The current delay parameter $d_{ij}$ is computed as follows:

$$d_{ij} = \frac{T_{ij}^{delay}(t)}{R_{ij}^{delay}},$$

where $T_{ij}^{delay}(t)$ is a delay indicator value. The delay indicator value $T_{ij}^{delay}(t)$ is decremented by the encoder packet size whenever a packet is transmitted that is part of the stream being served, and is incremented by the value of $R_{ij}^{delay}(t)$ during each timeslot. However, the delay indicator value $T_{ij}^{delay}(t)$ is not permitted to fall below 0.

It can be shown that if the value of $d_{ij} \leq D_{ij}$ at all times t, and the traffic arrivals at mobile unit i at any time interval [s,t] are bounded by $\sigma_{ij}+R_{ij}^{delay}(t-s)$, where $\sigma_{ij}$ is a value indicating the burstiness of the data stream ij, then the delay experienced by the stream ij is bounded by $(\sigma_{ij}/R_{ij}^{delay})+D_{ij}$. The value of $\sigma_{ij}$ for a data stream ij can be measured or estimated in ways known in the art, and the observations above can be used to determine an appropriate value for $D_{ij}$.

Once the value of $d_{ij}$ has been determined, the value of $w_{ij}$ can be computed as the value of a function of $d_{ij}$:

$$w_{ij}=f(d_{ij}) \quad (3)$$

Various options exist for the form of the function $f(d_{ij})$, chosen depending on the particular requirements of the particular data stream to which the function $f(d_{ij})$ relates. For example, a data stream may be highly intolerant to violations of the delay limit, in which case the function $f(d_{ij})$ should experience a very high growth rate as the delay approaches the limit $D_{ij}$, while a data stream that is more tolerant to delays should not experience such an extreme growth rate. The specific function $f(d_{ij})$ for a particular data stream may be chosen through analysis of the actual or expected traffic characterizing the data stream, for example, measurements and simulations of the traffic in order to discover delay tolerances and scheduling techniques that will meet the delay requirements for the data stream.

Suitably, parameters $c_1$ and $c_2$ may be defined in order to adjust the function $f(d_{ij})$, and the general shape of the function may be determined by choosing a specific equation defining the relationship between $c_1$, $c_2$, $d_{ij}$ and $D_{ij}$. Suitably, the function $f(d_{ij})$ may be chosen such that the value of $f(d_{ij})$ monotonically increases with the value of $d_{ij}$ and should be small for values of $d_{ij}$ at or near 0. The parameters $c_1$ and $c_2$ may be chosen using curve fitting techniques, for example choosing desired values of a function at various points and choosing values of $c_1$ and $c_2$ such that the function $f(d_{ij})$ has the chosen values at the chosen points.

Some of the possible definitions of $f(d_{ij})$ are as follows:

$$f(d_{ij}) = \frac{c_1 \cdot d_{ij}}{D_{ij}} - c_2 \quad (4)$$

Equation (4) is appropriate for a data stream that exhibits some delay tolerance. It will be observed that the value of $f(d_{ij})$ rises linearly as the value of $d_{ij}$ increases, and that no extreme growth occurs as the value of $d_{ij}$ approaches or exceeds that of $D_{ij}$.

$$f(d_{ij}) = \frac{-c_1 \cdot \log p_{ij} \cdot d_{ij}}{D_{ij}} - c_2, \quad (5)$$

where $p_{ij}$ is a packet violation probability that can be allowed for the data stream.

Equation (5) is similar to equation (4), but allows for different characteristics depending on the value of $p_{ij}$. The value of $p_{ij}$ is the acceptable probability that the delay limit $D_{ij}$ will be violated. A lower value of $p_{ij}$ indicates a less delay tolerant data stream, and provides for a higher rate of growth of $f(d_{ij})$ as the value of $d_{ij}$ increases, while a higher value of $p_{ij}$ indicates a more delay tolerant data stream, and provides for a lesser rate of growth of $f(d_{ij})$ as the value of $d_{ij}$ increases.

Another possible definition is $$f(d_{ij}) = \frac{c_1}{D_{ij} - d_{ij}} - c_2 \quad (6)$$

Equation (6) is appropriate for a highly delay intolerant data stream, and exhibits a very high rate of growth as the value of $d_{ij}$ approaches that of $D_{ij}$.

As an alternative to the expressions above, it may be convenient to define the urgency value $w_{ij}$ in terms of the expression $$w_{ij} = f(x), \quad (7)$$

where $$x = 1 - \frac{d_{ij}}{D_{ij}}. \quad (8)$$

The value of x indicates the degree to which the delay being experienced by a data stream has approached the delay limit $D_{ij}$, with a value of 0 indicating that the delay has reached the limit. The value of the function $f(x)$, and thus the urgency value, tends to increase as the value of x decreases. An appropriate expression of $f(x)$ is as follows:

$$f(x) = \frac{c_1}{x} - c_2. \quad (9)$$

The value of $f(x)$ increases without bound as the value of $d_{ij}$ approaches that of $D_{ij}$, and the precise behavior of $f(x)$ can be defined by the selection of appropriate values of $c_1$ and $c_2$. To take an example, if it is desired that $f(x_0)=0$ and $f(x_h)=\log(h)$, then $$c_2 = \frac{x_h \log(h)}{x_0 - x_h} \text{ and } c_1 = x_0 c_2.$$

If the transmission processing module 111 is designed to include a timestamp module 130 in order to mark the time of a service request, then a type 2 stream can be accommodated. The timestamp module 130 receives information specifying the specific time at which each packet belonging to a data stream is received. The base station 102A receives data from various data sources, with packets being received from each data source and addressed for transmission to an appropriate mobile unit. For example, the base station may receive one or more video streams from a video server 132, with data being routed from the video server 132 to the base station 102A through a network interface 134. Each data packet is routed to a unit buffer for the mobile unit to which the packet is addressed. If the timestamp module 130 is present in the base station 102A and a received data packet requires timestamp information, for example if the data packet is part of a stream having sufficiently high delay sensitivity to require it, a timestamp is stored indicating when the data packet entered the unit buffer.

In a type 2 data stream, each protocol data unit (PDU), or packet, of the stream must be transmitted within the time $D_{ij}$. The timestamp module 130 passes information for the time a packet was received to the scheduler 112, which is able to determine the delay currently experienced by the data stream. The urgency value of a type 2 data stream is given by equation (3), that is, $$w_{ij} = f(d_{ij}) \tag{3}$$

with the function $f(d_{ij})$ again defined according to an appropriate equation, such as one of the equations (4)–(6). However, the value of $d_{ij}$ is defined as the absolute delay of the next in queue PDU, that is, a specifically predefined time within which the next PDU in the data stream must be delivered.

The value of $w_{ij}$ is computed differently for type 0, type 1 and type 2 streams, but once the values of $w_{ij}$ are computed for each data stream, the values can be directly compared in order to select the value of $w_i$ for each mobile unit so that the value of $SP_i$ can be computed. Then, once a mobile unit is selected for service, the values of $w_{ij}$ can be compared in order to select the data stream to be served.

It will be noted that the scheduler 112 does not simply examine the various streams and choose the stream for which the value of $w_{ij}$ is highest. Instead, as described above, the scheduler 112 examines each mobile unit, computes the values of $w_{ij}$ for that mobile unit and chooses the highest value of $w_{ij}$ for that mobile unit as the value of $w_i$. Only after having selected the mobile unit having the highest priority does the scheduler 112 turn to an examination of the values of $w_{ij}$ for the various data streams serving that mobile unit in order to choose the data stream to be served. If no data stream serving a mobile unit is in danger of violating its delay requirements, the urgency value $w_i$ for the mobile unit should be 0, and delay considerations should not give additional priority to the mobile unit.

It will also be recognized that the specific combination of considerations taken into account by equation (1) above is not the only combination of considerations that may be used to schedule service according to the teachings of the present invention. Equation (1) takes into account the delay requirements of each mobile unit. In addition, equation (1) takes into account a balance between highest overall throughput and "fairness" to each mobile unit, a minimum rate guarantee and, if desired, a maximum rate limitation for each mobile unit. It is not necessary to take all of the various rate considerations into account, and the operation of the scheduler 112 can easily be modified in order to take only desired considerations into account. For example, it may not be desired to provide a guaranteed rate for each mobile unit, in which case the rate token counter value $T_i$ would not be used. In another case, it might not be desired to provide proportional fairness in selecting a mobile unit and stream for service, in which case the average service rate $R_i$ for a mobile unit would not be used. If an implementation is designed so as not to provide a guaranteed rate for a mobile unit, the scheduler 112 could assign priorities using the following computation:

$$SP_i = \frac{r_i(t)}{R_i} e^{w_i} \tag{10}$$

in place of equation (1). Similarly, if neither a guaranteed rate nor throughput fairness is a concern, the scheduler 112 could assign priorities using the following computation:

$$SP_i = r_i(t) e^{w_i} \tag{11}$$

in place of equation (1).

In most implementations, the computation of the scheduling priority can be expected to employ the available transfer rate $r_i(t)$, because scheduling the mobile unit that can achieve the best throughput will tend to maximize overall throughput. Especially at times when no mobile unit is in danger of violating its delay requirements, the desire to maximize overall throughput can be treated as an important, or even the dominant, consideration. One important consideration, particularly if type 2 data streams are used, is the prevention of hogging, that is, the allocation of excessive system resources to a mobile unit. Aspects of hogging prevention are described in Andrews et al., entitled "Method for Controlling Resource Allocation in a Wireless Communication System," U.S. patent application Ser. No. 10/459,010, filed on Jun. 11, 2003, which is assigned to a common assignee with the present invention and is incorporated herein by reference in its entirety.

In order to prevent hogging by a mobile unit, the total fraction g of total timeslots that can be allocated to a single user is defined. The fraction g may be a constant, or may be defined in terms of the number of active users. For example, the following expression may be used:

$$g = \frac{c}{N},$$

where N is the total number of active users and c is some number greater than 0. In addition, the maximum possible value of g is also defined. For example, the value of g may be capped at 0.7, so that no single mobile unit is allowed to use more than 70% of the available timeslots.

After a frame consisting of s timeslots has been transmitted, the timeslot usage of each mobile unit, that is, an exponentially smoothed proportion of timeslots used by each mobile unit i, is updated.

If hogging prevention is being performed, the scheduler 112 modifies the per unit rate token counter value $T_i$ employed in equation (1), as well as the delay indicator value $T_{ij}^{delay}$ used to evaluate the delay conditions for each data stream. If $g_i > g$ and $T_i \geq 0$, where $g_i$ is the actual proportion of timeslots being used by the mobile unit i, the rate token counter $T_i$ is not incremented. In addition, values for the streams ij serving the mobile unit are examined. For each stream ij serving a mobile unit i, if $g_i > g$ and $0 \leq T_i \leq 5000$, and $w_{ij} > 0$, the delay indicator value $T_{ij}^{delay}$ is not incremented for that stream.

Hogging prevention serves to prevent a mobile unit experiencing a poor data transfer rate from monopolizing system resources in order to achieve its prescribed level of service. A type 2 data stream is subject to an absolute delay limit. If a mobile unit receiving a type 2 data stream is in a location that receives a poor data transfer rate, the priority assigned to that mobile unit may be extremely high, so that the devotion of resources to serving that mobile unit tends to prevent other mobile units from being served. Hogging prevention techniques provide assurance that the priority assigned to such a mobile unit will not be excessively elevated.

Hogging prevention helps to prevent excessive consumption of system resources by a mobile unit, but it will be recognized that system overloading may occur in ways that are not dealt with by hogging prevention techniques or by other scheduling priority techniques taught by the present invention. For example, the system 100 may simply be subject to excessive demand from the presence of too many users, each user making normal demands on system resources. Such cases are typically dealt with by overload control techniques not discussed in detail here but known in the art. Overload control may include techniques such as denying access to new users, or implementing a predetermined resource allocation protocol, for example allocating resources to users proportionally based in priority. For example, if the system 100 were overloaded to the extent that it could only offer 75% of acceptable performance, each user could be allocated 75% of the resources called for by his or her priority. Other, more complex techniques could also be implemented, for example tending to allocate resources away from mobile units engaged in operations that were relatively insensitive to periods of low data rate or high delay, in favor of mobile units engaged in more sensitive operations.

Figure 2:
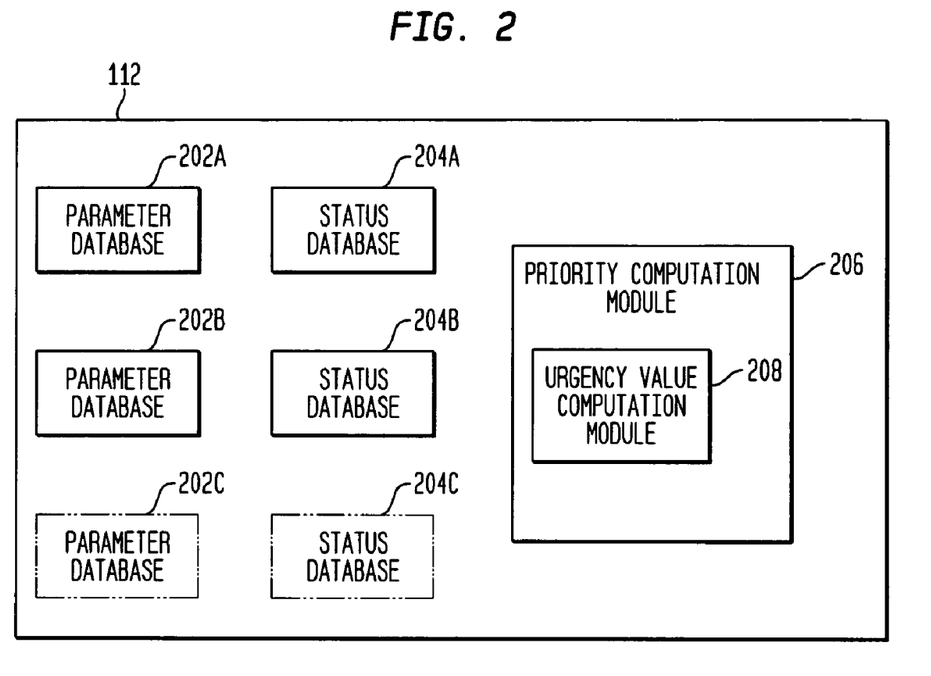
FIG. 2 illustrates a wireless network scheduler according to an aspect of the present invention.

FIG. 2 illustrates additional details of the scheduler 112. The scheduler 112 includes a plurality of unit parameter databases 202A–202C, storing parameters, such as rate and delay requirements. The databases 202A–202C store parameters for the mobile units 104A–104C of FIG. 1, respectively. Rate and delay requirements may be received for each data stream transmitted to a mobile unit, and may be updated based on information received from a mobile unit or from known characteristics and requirements of a data stream to be transmitted to a mobile unit. Each of the databases 202A–202C stores minimum and maximum rate requirements for its associated mobile unit, and the maximum allowable delay for each data stream serving the mobile unit. The scheduler 112 further comprises unit status databases 204A–204C, storing current information for the mobile units 104A–104C, respectively. Each of the databases 204A–204C receives and stores current rate and delay information for its associated mobile unit, including current and average rate information for each mobile unit and service information for the mobile unit, including the size of the most recent packet delivered to the mobile unit. If the system 100 of FIG. 1 is designed so that timing information is provided with data transmissions, each of the databases 204A–204C also stores timing information for each transmission to its associated mobile unit.

The scheduler 112 also includes a priority computation module 206 that determines the priority for each mobile unit and data stream and selects a mobile unit for service. The module 206 performs priority computations based on current and average rate for each mobile unit as well the urgency value for each mobile unit. Suitably, priority computation is performed by using an equation such as equation (1), (7), (8) or a similar equation to perform the needed computation based on desired criteria. The module 206 notes the maximum priority value and identifies the mobile unit associated with that priority value as the mobile unit to be served.

The priority computation module employs an urgency value computation module 208 that computes the urgency value of each data stream, suitably using techniques described above, and supplies these values to the module 206 for use in computing priority values of each mobile unit and data stream.

Figure 3:
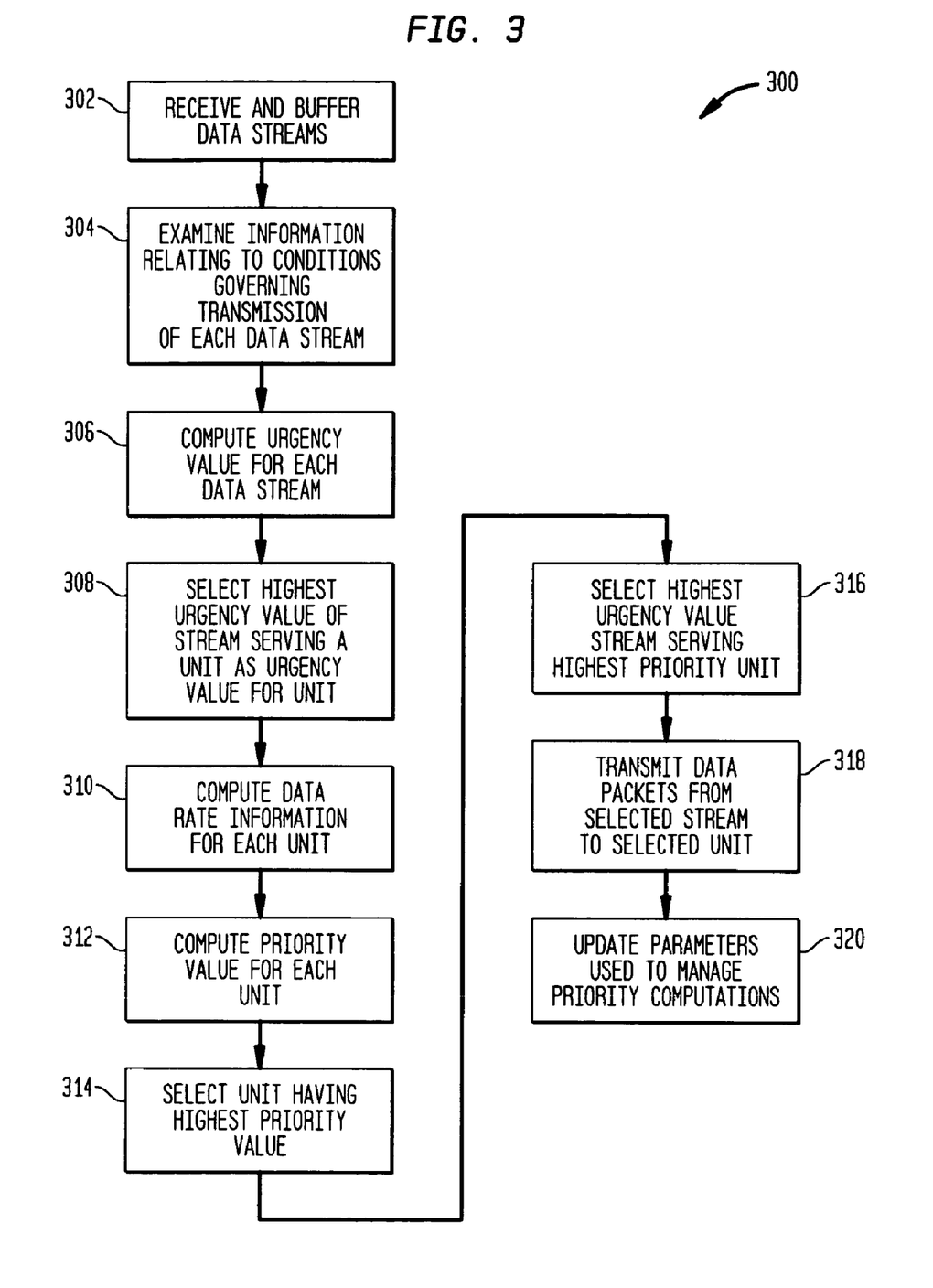
FIG. 3 illustrates a process of scheduling service in wireless networks according to an aspect of the present invention.

FIG. 3 illustrates a process 300 of wireless communication according to an aspect of the present invention. The process 300 may suitably be performed using a system such as the system 100 of FIG. 1. At step 302, a plurality of data streams are received for transmission to each of a plurality of mobile units, with data in each data stream being buffered for transmission when service is scheduled for an application being served by the data stream. Each mobile unit may host a plurality of applications, with multiple data streams serving each mobile unit, one data stream for each application hosted by the mobile unit. At step 304, information is examined relating to the conditions governing transmission of each data stream, including the conditions prevailing for each mobile unit, the average service that has been so far received by each mobile unit and data stream, service requirements for each mobile unit, delay requirements for each mobile unit and data stream and current delay experienced by each mobile unit and data stream. At step 306, an urgency value for each data stream is computed, based on the delay category, or type, of the data stream, a delay parameter computed for each data stream and a delay limit for each data stream. At step 308, the highest urgency value of the data streams serving a mobile unit is selected as the urgency value for that mobile unit. At step 310, data rate information related to each mobile unit is computed, including the current data rate available for transmission to that mobile unit, the average transmission rate received by that mobile unit and information relating to guaranteed transmission rates for the mobile unit.

At step 312, a priority value for each mobile unit is computed, with the priority value based on a balancing of factors relating to efficient overall throughput, acceptable data rates for each mobile unit, minimum guaranteed data rates for each mobile unit, and an acceptably low delay for the mobile unit as characterized by the urgency value for the mobile unit. At step 314, the mobile unit having the highest priority value is selected for service. At step 316, the data stream having the greatest urgency value of those associated with the mobile unit selected for service is scheduled for transmission. At step 318, data packets from the selected data stream are transmitted to the selected mobile unit. At step 320, updates are made to various parameters used to manage priority computations. The updates include incrementing token counters and indicator values associated with each mobile unit and decrementing token counters and indicator values associated with mobile units and data streams that have been served. The updates also suitably include incrementing values indicating the average rate experienced by each mobile unit.

While the present invention is disclosed in the context of a presently preferred embodiment, it will be recognized that a wide variety of implementations may be employed by persons of ordinary skill in the art consistent with the above discussion and the claims which follow below. For example, the discussion above has described the invention in terms of allocating timeslots among users, but it will be recognized that resource allocation may be implemented in any number of different ways and that the teachings of the present invention may be adapted to different ways of allocating resources to users.

We claim:

1. An apparatus for transmitting data to at least one of a plurality of remote mobile units, comprising:
a base station configured to serve the remote mobile units, the base station further comprising:
a communication interface for transmitting data to the remote mobile units; and
a processor for assigning scheduling priorities to each mobile unit, the scheduling priority assigned to a mobile unit determining a relative allocation of bandwidth resources to that mobile unit, the scheduling priority assigned to a mobile unit being based at least in part on the sensitivity to delay of one or more data streams serving the mobile unit and the delay currently experienced by the one or more data streams serving the mobile unit, wherein a data stream urgency value is computed for each data stream serving each mobile unit, wherein the data stream urgency value for a data stream is computed based on the sensitivity to delay of the data stream and the delay currently experienced by the data stream, wherein a unit urgency value is assigned to the mobile unit, the unit urgency value being the highest data stream urgency value for the data streams serving the mobile unit, and wherein the scheduling priority for the mobile unit is based on the unit urgency value for the mobile unit.

2. The apparatus of claim 1, wherein a data stream that is relatively insensitive to delay is assigned a data stream urgency value that does not increase with the delay experienced by the data stream.

3. The apparatus of claim 1, wherein a data stream urgency value that increases with the delay experienced by the data stream is computed for a data stream that is sensitive to delay.

4. The apparatus of claim 1, wherein a data stream urgency value for a data stream having a relatively high sensitivity to delay exhibits a high rate of increase as the delay experienced by the data stream approaches a predefined limit.

5. The apparatus of claim 1, wherein the delay experienced by one or more data streams is calculated based on a known transmission time for an immediately prior transmission and a predetermined time within which the next transmission must occur.

6. The apparatus of claim 1, wherein the urgency value for a data stream that is relatively insensitive to delay does not increase with the delay experienced by the data stream and wherein the urgency value for a data stream that is sensitive to delay increases with the delay experienced by the data stream, the current delay value for a data stream depending on a delay indicator value that is incremented during each timeslot, the delay indicator value being decremented by an encoder packet size of a transmission serving the data stream whenever the data stream is served.

7. The apparatus of claim 6, wherein the delay indicator value for a data stream is incremented by a predetermined increment value during each timeslot, with the increment value being defined for the data stream.

8. The apparatus of claim 7, wherein the current delay value is a ratio of the delay indicator value to the increment value.

9. The apparatus of claim 1, wherein the base station serves one remote mobile unit during a timeslot and wherein the processor is operative to select the mobile unit for transmission that has the highest scheduling priority computed for the selected timeslot.

10. The apparatus of claim 1, wherein the processor is further operative to compute available service rates to each mobile unit and to take the available service rate for each mobile unit into account when computing scheduling priorities for the various mobile units.

11. An apparatus for transmitting data to at least one of a plurality of remote mobile units, comprising:
a base station configured to serve the remote mobile units, the base station further comprising:
a communication interface for transmitting data to the remote mobile units; and a processor for assigning scheduling priorities to each mobile unit, the scheduling priority assigned to a mobile unit determining a relative allocation of bandwidth resources to that mobile unit, the scheduling priority assigned to a mobile unit being based at least on the sensitivity to delay of one or more data streams serving the mobile unit and the delay currently experienced by the one or more data streams serving the mobile unit, and a rate token counter which produces a rate token counter value, wherein the scheduling priority for each mobile unit depends in part on a value computed to provide for proportional fairness among mobile units by increasing the scheduling priority of the mobile unit as the average service rate experienced by the mobile unit decreases, the computation of said computed value utilizing the rate token counter value.

12. The apparatus of claim 11, wherein the scheduling priority assigned to each mobile unit depends in part on a value computed to achieve a minimum service rate for each mobile unit by increasing the priority of the mobile unit as the service rate experienced by the mobile unit decreases toward a minimum assured service rate for the mobile unit.

13. An apparatus for transmitting data to at least one of a plurality of remote mobile units, comprising:
a base station configured to serve the remote mobile units, the base station further comprising:
a communication interface for transmitting data to the remote mobile units; and a processor for assigning scheduling priorities to each mobile unit, the scheduling priority assigned to a mobile unit determining a relative allocation of bandwidth resources to that mobile unit, the scheduling priority assigned to a mobile unit being based at least in part on a value computed based on the sensitivity to delay of one or more data streams serving the mobile unit and the delay currently experienced by the mobile unit, a value computed so as provide for an increased scheduling priority for a mobile unit as the mobile unit experiences an increased available transmission rate and by increasing the scheduling priority of a mobile unit as the average service rate experienced by the mobile unit decreases, and a value computed so as to provide for an increased scheduling priority of the mobile unit as the service rate experienced by the mobile unit decreases toward a minimum assured service rate for the mobile unit, wherein the scheduling priority for each mobile unit i is given by the formula $$SP_i = \frac{r_i(t)}{R_i} e^{a_i T_i + w_i},$$

where $SP_i$ is the scheduling priority value for the mobile unit i, $r_i(t)$ is the effective transfer rate to mobile unit i at time t, $R_i$ is the average service rate that mobile unit i has experienced, $T_i$ is the value for mobile unit i of a token count designed to ensure a minimum service rate for each mobile unit and $w_i$ is the urgency value for the mobile unit i, and wherein the value $a_i$ is an adjustable parameter $a_i$ affecting a timescale over which the actual rate of service will tend to track a target rate or rates.

14. A scheduler for managing data transmission to at least one of a plurality of remote mobile units, comprising:
a unit status database for receiving and storing status information relating to data transmission to the mobile units;
a unit parameter database for storing information relating to data transmission requirements for each mobile unit; and
a priority computation module for examining the status information and the unit parameters for each mobile unit and to assign a scheduling priority to each mobile unit, the priority computation module assigning a priority to each mobile unit based at least in part on the delay sensitivity of one or more data streams serving the mobile unit and the delay experienced by the one or more data streams serving the mobile unit, wherein the priority computation module is further operative to compute an urgency value for each data stream serving each mobile unit, the data stream urgency value for a data stream being computed based on the sensitivity to delay of the data stream and the delay currently experienced by the data stream, wherein the priority computation module is further operative to assign a unit urgency value to the mobile unit, the unit urgency value being the highest data stream urgency value for the data streams serving the mobile unit, the priority computation module being further operative to compute the scheduling priority for the mobile unit based on the unit urgency value for the mobile unit.

15. The scheduler of claim 14, wherein the priority computation module is further operative to compute the urgency value of each mobile unit based on an urgency value of one or more data streams serving the mobile unit, with the urgency value for the mobile unit being equal to the highest urgency value for a data stream serving the mobile unit.

16. The scheduler of claim 14, wherein the urgency values for data streams that are relatively insensitive to delay do not increase with the delay experienced by the data streams.

17. The scheduler of claim 14, wherein the priority computation module computes an urgency value for delay sensitive data streams such that the urgency values for the data streams increase with the delay experienced by the data streams.

18. The scheduler of claim 14, wherein the delay experienced by one or more data streams is calculated based on a known transmission time for an immediately prior transmission and a predetermined time within which the next transmission must occur.

19. The scheduler of claim 14, wherein the priority computation module is further operative to compute values tending to increase the scheduling priority of each mobile unit as an achievable service rate for the mobile unit increases and tending to increase the scheduling priority of each mobile unit as an average service rate experienced by the mobile unit decreases, and tending to increase the scheduling priority of each mobile unit as the service rate experienced by the mobile unit decreases toward a minimum assured service rate and to take these values into account in computing the scheduling priority for each mobile unit.

20. A method of data transmission to a selected at least one of a plurality of remote mobile units, comprising the steps of:
computing a scheduling priority for each mobile unit, the computation of the scheduling priority being based at least in part on the delay sensitivity of one or more data streams serving the mobile unit and the delay experienced by the one or more data streams serving the mobile unit; and
selecting for service from among the plurality of mobile units the mobile unit having the highest scheduling priority, wherein the step of computing the scheduling priority includes the steps of:
computing an urgency value for each data stream serving each mobile unit, the data stream urgency value for a data stream being computed based on the sensitivity to delay of the data stream and the delay currently experienced by the data stream; and
assigning a unit urgency value to the unit, the unit urgency value being the highest data stream urgency value for the data streams serving the unit.

21. The method of claim 20, wherein the computation of the urgency value of a mobile unit includes computation of the urgency value of each of a plurality of data streams serving the mobile unit and setting the urgency value of the mobile unit equal to the highest urgency value for a data stream serving the mobile unit.

* * * * *